United States Patent [19]

Franklin, Jr.

[11] 4,272,461

[45] Jun. 9, 1981

[54] APPARATUS FOR MIXING GASES WITH LIQUIDS

[76] Inventor: Grover C. Franklin, Jr., 2250 Warmouth St., San Pedro, Calif. 90732

[21] Appl. No.: 18,054

[22] Filed: Mar. 6, 1979

[51] Int. Cl.³ .............................................. B01F 3/04
[52] U.S. Cl. ...................................... 261/93; 210/219; 210/220; 261/123
[58] Field of Search ................ 261/93, 119 R, 121 R, 261/123, 87, 36 R, 77, 29, 30; 210/14, 220, 219

[56] References Cited

U.S. PATENT DOCUMENTS

| | | |
|---|---|---|
| 1,144,342 | 6/1915 | Andrews . |
| 2,389,524 | 11/1945 | Loewenstern ........................ 261/93 |
| 2,639,129 | 5/1953 | De Rosset ............................ 261/93 |
| 2,800,315 | 7/1957 | Griesbach ............................ 261/87 |
| 3,032,496 | 5/1962 | Griffith ............................... 210/14 |
| 3,092,678 | 6/1963 | Braun .................................. 261/30 |
| 3,148,509 | 9/1964 | Laurie . |
| 3,206,176 | 9/1965 | Peterson .............................. 261/29 |
| 3,452,966 | 7/1969 | Smolski ............................... 261/77 |
| 3,625,834 | 12/1971 | Muller ............................. 261/93 X |
| 3,829,070 | 8/1974 | Reba et al. ........................... 261/77 |
| 3,852,384 | 12/1974 | Bearden ............................... 261/77 |
| 3,865,721 | 2/1975 | Kaelin ............................. 210/220 X |
| 3,947,359 | 3/1976 | Laurie ............................. 261/77 X |
| 3,968,086 | 7/1976 | Romanowski .................... 261/123 X |
| 3,969,446 | 7/1976 | Franklin, Jr. ........................ 261/87 |
| 4,029,724 | 6/1977 | Muller et al. ........................ 261/87 |
| 4,045,522 | 8/1977 | Nafziger ............................. 261/93 |
| 4,087,496 | 5/1978 | Perrot ................................. 261/93 |
| 4,096,215 | 6/1978 | Albrecht .......................... 261/121 R |

FOREIGN PATENT DOCUMENTS 748307 12/1966 Canada ................................. 261/123

Primary Examiner—Richard L. Chiesa
Attorney, Agent, or Firm—Tak Ki Sung

[57] ABSTRACT

An apparatus for mixing gas with liquid comprising:
(a) an inner cylindrical member comprising an elongated tube having upper and lower ends and a plurality or turbines, which are free to rotate about their longitudinal axis, mounted within the tube, the turbines being spaced apart from one another and so constructed that adjacent turbines have different rotational direction or velocity;
(b) optionally, an outer cylindrical member comprising an elongated tube having upper and lower ends and a plurality of openings in the lower half of the tube wall;
(c) a base member to which the lower ends of the outer and inner cylindrical members are attached so that the lower ends are sealed, the outer and inner cylindrical members being arranged in a concentric manner; and
(d) a gas inlet pipe for introducing gas bubbles into the apparatus.

The apparatus is useful for aerating sludge, separating the lower end of the fine particles contained in a slurry, and separating particles having smooth surfaces from particles having jagged surfaces. Problems regarding plugging and tangling of the turbines with foreign materials are eliminated.

7 Claims, 3 Drawing Figures

U.S. Patent    Jun. 9, 1981    4,272,461
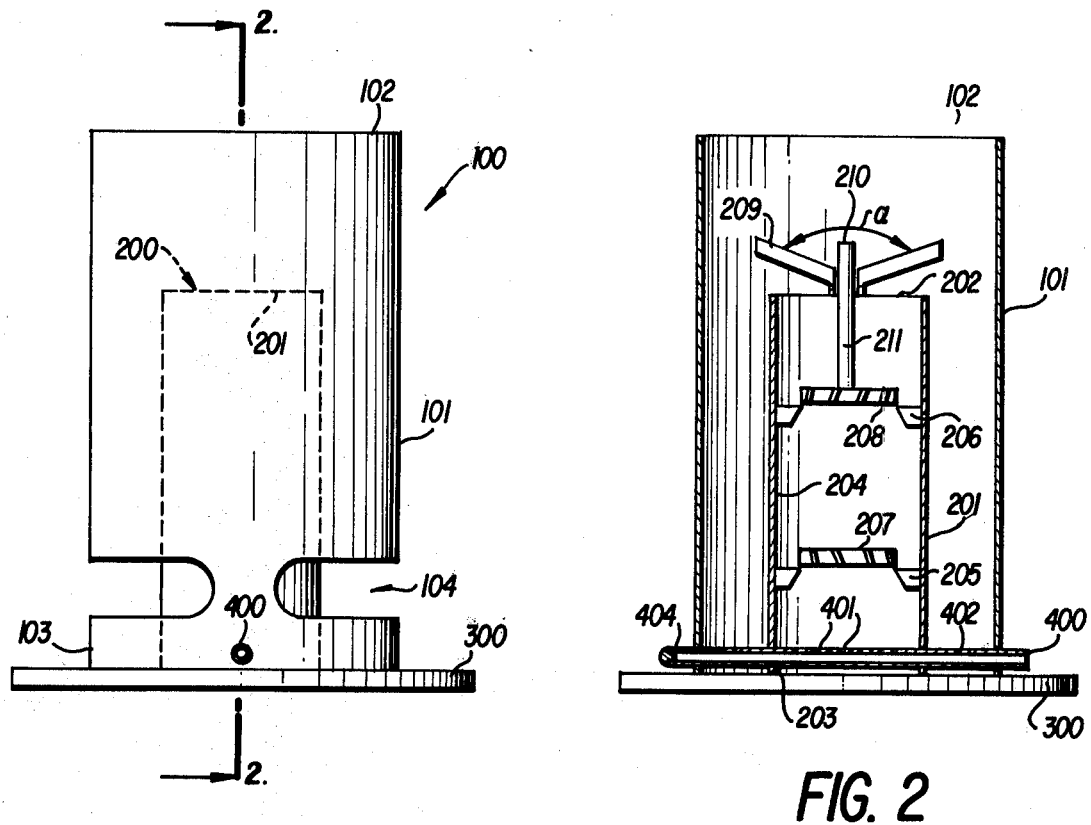
FIG. 1
FIG. 2
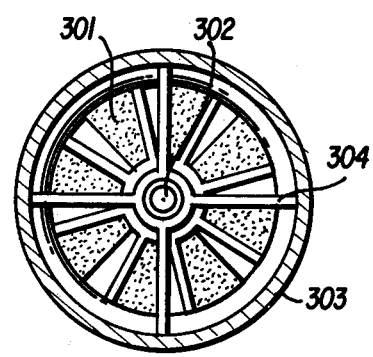
FIG. 3

APPARATUS FOR MIXING GASES WITH LIQUIDS

BACKGROUND OF THE INVENTION

1. Field of the Invention

The field of this invention generally relates to the mixing of gases with liquids. More specifically, it relates to the aeration of liquids by the passage of gas bubbles through an apparatus which is vertically submerged in the liquid and within which apparatus the rising gas bubbles are broken up by mechanical action into a multitude of much smaller gas bubbles which are dispersed within the liquid.

2. Description of the Prior Art

Aeration of liquids is commonly performed, for example, to accelerate bacteriological decomposition of liquid waste, to prevent algae formation on the surfaces of stagnant pools or ponds, and so forth. The term "aeration" as employed herein is to be understood as denoting the introduction of any type of gas into any type of liquid.

The simplest method of aeration comprises introducing a gas into a liquid through holes in an appropriate supply line. Some of this gas is absorbed as the gas bubbles rise through the liquid. Unabsorbed gas escapes from the surface of the liquid, and may or may not be captured for recirculation.

In spite of its simplicity, this method is very inefficient. The gas bubbles, even if small, when introduced into the liquid, tend to aggregate into large bubbles or slugs of gas as they rise. These gas slugs have comparatively small surface-area-to-volume ratios, thus relatively little gas-to-liquid contact. This results in relatively low rates of gas absorption by the liquid at the liquid-gas interfaces. If the openings in the gas outlet are made very small to introduce small gas bubbles, fouling or plugging of the openings often occurs. In addition, the transit time of the gas through the liquid may be quite short if the liquid container, for example, a pond or holding tank, is shallow. This short gas-to-liquid contact time further results in an inefficient rate of gas absorption by the liquid. In addition, minimum turbulence is created for disrupting the liquid-gas interfaces, disruption and renewal of the interfaces being essential for high rates of gas absorption or mass transfer.

Some slight improvement in absorption efficiency is obtained by the use of nozzles at the gas injection openings which introduce the gas into liquid in a swirling manner so as to create some degree of turbulence. This tends to delay somewhat the formation of large gas slugs and to disperse the gas bubbles through a large volume of liquid. However, high absorption efficiencies are still not obtained.

More commonly used processes employ the pneumatic (or air) lift pump principle. When a gas is bubbled up through an elongated tube which is vertically submerged in a liquid, the buoyancy force of the rising gas bubbles causes an upward lifting or flow of the liquid through the tube. This upward flow causes a circulation within the entire body of liquid, with the liquid being continually drawn into the bottom of the tube and being discharged from the top thereof. Turbulence in the liquid above the top of the tube (which is normally submerged well below the surface of the liquid) tends to improve the absorption rate of the gas by breaking up, to some extent, large gas slugs and by disrupting and renewing the liquid-gas interfaces (see for example U.S. Pat. No. 3,032,496). The liquid circulation and turbulence caused by such pneumatic lifts may also be used to prevent formation of ice on the surface of the liquid, or to reduce the magnitude of surface waves, for example in a harbor area. The absorption efficiency obtained is still much less than desired, however, because large gas slugs tend to form and remain unbroken, and because the gas-liquid contact time is not appreciably increased. Therefore, a considerable amount of gas must be pumped through such pneumatic lift tubes in order that a small amount may be absorbed by the liquid. Because of the inefficiency in the absorption process, much of the energy used to pump the gas is wasted.

Helical tube dividers installed in some pneumatic lift tubes (for example, U.S. Pat. Nos. 1,144,342 and 3,452,966) increase the gas-liquid contact time by providing increased path links for the gas bubbles to travel as they spiral up through the tubes. In addition, the gas and liquid exit from the tops of the tubes with a rotational motion, thereby somewhat increasing the turbulence thereabove. However, large slugs of gas still tend to form within the tubes, with still relatively poor absorption efficiency. Some helical tube dividers (for example U.S. Pat. No. 1,144,342) are provided with holes interconnecting the adjacent chambers to help prevent formation of large gas slugs. There is still a tendency to produce small gas bubbles and the gas absorption efficiency is still much less than desired. Gas which is not absorbed in the bubble transit through the liquid is either lost or must be repumped through the liquid. This requires additional gas pumping capacity and horse power.

Because of inefficiencies of present pneumatic lift tube aerators, it has been necessary to pump relatively large amounts of gas through the liquid—only a relatively small portion actually being absorbed by the liquid—and to employ a relatively large number of pneumatic lift tubes, particularly when the liquid is contained in shallow tanks or ponds and short tubes must be used. Thus, there has been considerable wastage of gas pumping power with resulting high costs involved in such complex aerator systems.

Some aerators include a motor-driven, horizontally rotating submerged turbine. The non-enclosed turbine is generally positioned above a source of gas bubbles and is used to break up and disperse the released gas bubbles and to create turbulence in the liquid. Other aerators employ motor driven, vertically rotating, non-enclosed turbines or paddles at, or just below, the surface of a liquid. Such aerators usually rely upon the air above the surface of the liquid, some of which becomes entrapped in the churning liquid, for aeration. However, motor-driven aeration systems are expensive to produce, to operate, as well as to maintain. A source of power for the motor must also be available.

Most recently, an aerator having high efficiency for dispersing the gas in the liquid is set forth in U.S. Pat. No. 3,969,446. The aerator comprises an elongated tube having openings at both ends and having mounted therein one or more turbines which are free to rotate about the longitudinal axis thereof. The tube is vertically submerged in a liquid, for example, in a lake or pond of water. Air or another gas is supplied to the lower end of the tube. Gas bubbles rising through the tube cause an upward flow of liquid therethrough. The turbines are rotated solely by this upward flow of gas and liquid. This rotation of the turbine causes the gas bubbles to be broken up into a vast number of much smaller gas bubbles which are dispersed throughout the liquid so that optimum gas absorption may occur. When more than one turbine is used, the turbines are so constructed that adjacent turbines rotate either at different speeds or in counter-direction to thus optimize the breaking up of the gas bubbles. Although this device provides improved aeration efficiency, it suffers from the disadvantage that, when pumping liquid waste which contains such materials as hair, the hair becomes entangled in the turbine blades, thus reducing the efficiency of the aerator.

Thus, the present invention provides an apparatus for mixing gases with liquids which may contain solid matters, e.g. hair, which will plug or foul aeration devices known in the prior art.

SUMMARY OF THE INVENTION

In carrying out the principles of the present invention according to a preferred embodiment, an apparatus for mixing gas with liquids and pumping the resulting mixture comprises an outer cylindrical member, an inner cylindrical member, a base member, and a gas inlet member. The outer and inner cylindrical members are arranged in a concentric manner, with one open end of each of the members being attached to the same surface on the base member so that the ends of the cylindrical members are completely sealed. The gas inlet member is disposed through the inner and outer cylindrical members and near the end attached to the base member for the introduction of gas bubbles into the apparatus. Provided within the inner cylindrical member is at least one turbine, which is free to rotate along its longitudinal axis. Optionally, immediately upstream from each turbine, a venturi for restricting the cross-sectional area of the tube is provided. In addition, the open upper end of the inner tube may be provided with a check valve which may be lifted by the buoyant force of the rising bubbles and which attains a closed position when the gas applied to the apparatus is shut off. The closed check valve prevents the settlement of debris into the interior of the inner cylindrical member. The apparatus is adapted for immersion vertically into the body of water to be aerated and/or pumped.

BRIEF DESCRIPTION OF THE DRAWINGS

FIG. 1 is a front view of the apparatus of the present application;

FIG. 2 is the sectional view along line 2—2 in FIG. 1.

FIG. 3 illustrates the construction of a turbine used in this invention.

DETAILED DESCRIPTION OF THE INVENTION

This invention relates to an apparatus for introducing a gas (e.g. air) into a volume of liquid (e.g. water). The present apparatus may also be used as a pump for material transfer and for separating fine particulates from a slurry.

As shown in FIG. 1, a preferred embodiment of the apparatus which is adapted for vertical immersion into the liquid to be aerated or pumped, comprises an outer cylindrical member 100 (second stage), an inner cylindrical member 200 (first stage), a base member 300, and a gas inlet member 400. Outer cylindrical member 100 is mounted concentrically over inner cylindrical member 200, with the lower ends of the members being mounted onto the same surface on base member 300 to form a seal. Gas inlet member 400 having one end open and the other closed is mounted diametrically, transversely, and through concentric cylindrical members 100 and 200, near the sealed lower ends thereof.

The outer cylinder member 100 comprises an elongated tube 101 having an open upper end, 102, and a lower end, 103. A pair of diametrically opposed, horizontal, ellipsoidal openings 104 are provided along the circumference of tube 101. The distance between the opening and the lower end 103 of member 100 may be varied. However, the opening should not be located above the top of the inner cylindrical member 200. On the other hand, the opening can be situated adjacent to base member 300. The location of the openings depends on the amount of debris or solids present in the liquid to be pumped. In some particular applications, it may be desirable to have the openings at a distance from the base, e.g. when there is a large amount of sedimentation present. The height of the openings is from about 5% to 15% of the length of the tube, or up to the difference in radius between the outer and inner members. As to the width of the opening, it may vary in accordance with the strength of the material used. As long as the outer member can support its own weight, the size of the opening can be so varied. Generally, it is between about 30% to about 45% of the circumference of the tube.

The inner cylindrical member 200 comprises an elongated tube 201 having an upper open end 202 and a lower end 203 (FIG. 2). The inside diameter of tube 201 is from about $\frac{1}{4}$ to $\frac{2}{3}$ of the inside diameter of tube 101. The height ratio of tube 101 to tube 201 is from about 4:1 to 1.25:1, preferably from about 2:1 to 1.5:1. Mounted on the interior surface 204 of the tube is a plurality of venturis 205, 206. While only two venturis are shown in the drawings, any convenient number of venturis may be used, as required by the process. The venturis are for reducing the cross-sectional area of the tubing so that a higher liquid velocity therethrough can be obtained. Mounted immediately downstream for each of the venturis (i.e. the upper surface of the venturi) are turbines 207, 208. These turbines are free to rotate about the longitudinal axis thereof and are caused to rotate solely by the buoyant force of the rising gas bubbles. No external power source is connected to drive the turbines. The turbine has a diameter slightly less than the inside diameter of the venturi, to which it is mounted. The turbines are mounted at a distance apart and along the longitudinal axis of member 201. They are preferably spaced at about one inner tube 201 diameter apart and a similar distance from each end of the tube. Although the turbines may be mounted on one common central shaft, the use of such a shaft is not essential. As shown in FIG. 3, turbine 301 may be mounted on a central shaft attached to hub 302 which is connected to venturi 303 by means of a plurality of radially extending spokes 304. Thus, the turbines are so mounted that they are free to rotate about its longitudinal axis. Turbines 207 and 208 are substantially identical in size in the preferred embodiment. The turbine or propeller blade design is such that the upward flow of liquid and air through tube 201 (and solids entrained therein, if any) causes the turbines to rotate at relatively high rates of speed. It is noted that the blades for adjacent turbines are set at different angles so that adjacent turbines rotate in different directions or at different speeds. For example, for turbine 207, the blades are slanted from top left to lower right. Thus, turbine 207 may rotate counter-clockwise, whereas turbine 208 rotates clockwise. The difference in rotational directions or speeds enhances the break-up of the rising bubbles. Although only two turbines are shown in FIG. 2, any number of turbines can be used, depending on the needs of the particular process.

In the preferred embodiment, the upper end 202 of tube 201 is provided with a freely moving check valve or cover 209. Check valve 209 may be in the form of an inverted cone or a flat plate having an opening 210 at its center. The valve has a diameter which is slightly larger than the inside diameter of tube 201. Check valve 209 may be slidably-mounted through central opening 210 onto a vertical, central shaft 211 attached to the hub of the uppermost turbine. Alternatively, check valve 209 may be mounted on central shaft 211 attached to open end 202 by means of a suitable bracket (not shown). Check valve 209 is made of a material which is sufficiently light weight so that it may be lifted solely by the force of the rising bubbles. It is of utmost importance that check valve 209 be mounted in such a way that it can be easily opened by the rising bubbles and closed when the gas supply to the apparatus is shut off. In such a way, in the event that the apparatus has to be turned off, the check valve will cover open end 202 to prevent foreign materials from falling into and entangling the turbines, thus causing blockage and decreasing the efficiency of the apparatus. Check valve 209 can be in any suitable configuration. For instance, it may be in the form of an inverted cone (as shown in FIG. 2) or a flat plate. In the case of an inverted cone, the angle of inclusion, α, in FIG. 2 ranges from about 45° to about 70°. This angle may be varied according to the needs of the process in which the present apparatus is used. When the apparatus is used to pump and aerate only a liquid containing no solid or fibrous materials therein, there will be no problem with regard to plugging so that it is not necessary to include check valve 209 in the present apparatus.

Tube 201 is placed concentrically inside tube 101, as shown in FIGS. 1 and 2. Lower ends 103 and 203 of cylindrical members 101 and 201 are attached to the same surface of base plate 300 to form a liquid-tight seal. It is of importance to note that ends 103 and 203 are completely sealed by base plate 300. This closed arrangement prevents the sucking of solid materials (e.g. hair) into the interior chamber of tube 201, thus eliminating problems with respect to plugging and entangling of the turbines. The material to be pumped enters tube 101 through openings 104 and is lifted towards end 102, thus causing circulation. Base plate 300 can be made of any suitable material provided that it is sufficiently heavy and strong to stabilize the unit.

As shown in FIG. 2, gas inlet pipe 400 having open end 404 and closed end 403 is mounted diametrically and transversely through concentric tubes 101 and 201 and near the sealed lower ends of the tubes. A plurality of openings 401 is provided in the middle portion of the tubing for introducing the gas into the interior chamber of tube 201. Optionally, openings 402 in tube 400 may be provided in the annular space between tubes 101 and 201 to generate bubbles for additional pumping energy (secondary pumping).

The apparatus as shown in FIG. 2 (i.e., in the concentric tubes arrangement) can be used for pumping solids-containing liquids, without any plugging problems. It should also be noted that when it is desired to aerate a body of liquid, the present apparatus can be used without the outer cylindrical member 100. In other words, for use as a material transfer pump, the apparatus comprises both inner and outer cylindrical members 100 and 200 (stages 1 and 2); for use as an aerator, the apparatus may comprise inner tube 201 only (stage 1) or both inner tube 201 and outer tube 101 (stage 1 and 2).

It has been found that the present apparatus, when used as a pump does not give rise to any plugging problems, although a considerable amount of foreign solid materials, such as hair, may be present in the liquid to be pumped. The closed bottom ends construction of the concentric tubes prevents the foreign materials from entering into the inner tube. Thus, the possibility of the turbines being clogged or tangled is eliminated. Furthermore, the horizontal, ellipsoidal openings in the outer cylindrical member are sufficiently large to permit free passage of the foreign materials.

When in use, the apparatus is preferably completely submerged vertically in the liquid to be aerated or pumped. For best efficiency, upper open end 102 of tube 101 should be at or below, mid-depth of the liquid in which the apparatus is immersed. In any event, for good efficiency, upper end 102 should be at least one outer tube 101 diameter below the surface of the liquid. In the event that only the inner tube 201 is used, the upper open end 202 should be at, or below, mid-depth of the liquid to be circulated. Open end 202 should be at least one tube 201 diameter below the liquid surface. Gas to be mixed with the liquid is supplied through inlet pipe 400 from a suitable source (not shown). The gas leaves inlet pipe 400 through a plurality of orifices 401 to form a multitude of bubbles. As the gas enters the interior of tube 201, it rises towards the liquid surface in the form of bubbles. As the bubbles rise, they come into contact with the first turbine which is rotated by the buoyant force of the bubbles. The rotation of the turbines causes the bubbles to break up into a large number of small bubbles. The size of these bubbles is further reduced as they encounter the second turbine which is rotating in a direction opposite to or at a different speed from that of the first turbine. As a result, a large number of very small bubbles leaves the open end of tube 101. These small bubbles provide a large surface area for mass transfer, thus increasing the efficiency of the gas-liquid mixing process.

Typical dimensions for inner tube 201 are 4 inches in diameter and 8 inches in height, and for outer tube 101, 8 inches in diameter and 15 inches in height. Inner tube 201 may also be 8 inches in diameter, 16 inches in height, and for outer tube 101, 12 inches in diameter and 30 inches in height. The dimensions of the tubes can, of course, be changed in accordance with the magnitude of the process to which the apparatus is applied.

As to the flow rate of gas or air to be applied through the apparatus, it may be varied according to the needs of the particular process. Preferably, for an apparatus having a 8-inch diameter inner tube and a 12-inch diameter outer tube, a gas flow rate of from about 10 to about 20 SCFM is used. For an apparatus having a 4-inch diameter inner tube and an 8-inch diameter outer tube, a gas flow rate of from about 3 to about 5 SCFM is preferred.

The present apparatus finds application in a variety of processes. For example, the present apparatus comprising both outer and inner tubes may be used for aerating sludge or sewage, without any clogging or plugging problems.

As another application, the present apparatus having both inner and outer tubes may be used in the separation of olives in the food industry. In making the separation, it is desired to separate those olives having a smooth surface from those with jagged surfaces, which are undesirable. The olives are deposited in a tank which is filled with water at a height sufficient for the present apparatus to be operative. Air is introduced into the present apparatus, which comprises both inner and outer tubes, to generate circulation in the olive and water mixture. Those olives which have a jagged surface are pumped to the top of the tank. A possible explanation of this phenomenon is that air bubbles may be lodged in the jagged surface, thus causing the unacceptable olives to float. The undesirable olives may then be removed by skimming. The acceptable olives, i.e., those with a smooth surface, remain in the bottom of the tank. Thus, a separation of unacceptable and acceptable olives can be achieved by using the present apparatus.

It has further been found that the present apparatus may be used to separate fine particles from a slurry containing solid fine particles. In this instance, a one stage (i.e. inner tube only) or a two stage (both inner and outer tubes) apparatus may be used. The slurry to be separated is deposited in a suitable container in which the present apparatus is immersed. The height of the slurry is maintained at a level in which the present apparatus is operative. Compressed air (or any other useful gas) may then be introduced into the apparatus to generate bubbles. The fine particles contained in the slurry are pumped out of the apparatus, thus leaving a clear liquid within the lower portion of the interior of tube 201. This clear liquid may then be removed from the interior of tube 201. The particulates generally have a diameter ranging from about 5 to about 100 microns and are formed of a material heavier than water. Thus, there is provided a method for removing fine particles contained in a slurry. To cite a practical example, the present apparatus, either in the one stage or two stage mode, may be used for separating coal particles from a slurry comprising water and such coal particles.

The materials used in the construction of the apparatus of the present invention may be any noncorroding material (depending upon the liquid in which the apparatus is to be used). Tubes 101 and 201 may be stainless steel, polyvinyl chloride plastic, or fibreglass. The turbines may be stainless steel or urethane plastic. The shaft 211 may be stainless steel.

The foregoing description has been by way of illustration example only, and no limitation is thereby intended, the scope of the invention being limited solely by the claims.

What is claimed is:

1. An apparatus for mixing gas with liquid comprising:
   (a) an inner cylindrical member comprising an elongated tube having upper and lower ends and a plurality of turbines, which are free to rotate about the longitudinal axis thereof mounted within the tube, the turbines being spaced apart from one another and so constructed that adjacent turbines have different rotational direction or velocity, the tube having a solid, imperforate wall;
   (b) an outer cylindrical member comprising an elongated tube having upper and lower ends and a plurality of openings in the lower half of the tube wall, the outer and inner cylindrical members being arranged in a concentric manner;
   (c) a base member, to one surface of which the lower ends of the inner and outer cylindrical members are attached so that the lower ends are completely sealed; and
   (d) a gas inlet pipe for introducing gas bubbles into the lower end of at least one of the cylindrical members.

2. The apparatus of claim 1 wherein in the inner cylindrical member, immediately upstream from each turbine, a venturi is provided to increase the velocity of the liquid flowing therethrough.

3. The apparatus of claim 1 wherein the ratio of the diameters of the outer and inner tubes is from about 4:1 to about 1.5:1.

4. The apparatus of claim 1 wherein the ratio of the heights of the outer and inner tubes is from about 4:1 to about 1.25:1.

5. The apparatus of claim 1 wherein the top end of the inner cylindrical member is provided with a check valve which is opened by the buoyant force of the rising bubbles and closed when gas supply to the apparatus is shut off to prevent the settlement of solid matters into the interior of the inner cylindrical member.

6. The apparatus of claim 1 wherein the gas inlet pipe having one closed end and the other being connected to a gas supply means is disposed through the inner and outer cylindrical members and near the lower ends thereof, the pipe being provided with a plurality of openings for introducing gas bubbles into the interior of the inner tube.

7. The apparatus of claim 6 wherein the gas inlet pipe is additionally provided with a plurality of openings within the annular space between the outer and inner cylindrical members.

* * * * *